United States Patent [19]

Bee

[11] Patent Number: 4,738,862

[45] Date of Patent: Apr. 19, 1988

[54] METHOD FOR PRODUCING AN ICE CONFECTION PRODUCT AND ICE CONFECTION PRODUCT

[75] Inventor: Rodney D. Bee, St Neots, Great Britain

[73] Assignee: Thomas J. Lipton, Inc., Englewood Cliffs, N.J.

[21] Appl. No.: 860,069

[22] Filed: May 6, 1986

[30] Foreign Application Priority Data

May 9, 1985 [GB] United Kingdom ............... 8511702

[51] Int. Cl.$^4$ ................................ A23G 9/06
[52] U.S. Cl. ................... 426/565; 426/312; 426/68; 426/477; 62/1
[58] Field of Search ............ 426/565, 566, 567, 317, 426/68, 477, 312; 62/1, 69, 48, 70

[56] References Cited

U.S. PATENT DOCUMENTS

| | | | |
|---|---|---|---|
| 2,029,025 | 1/1936 | Justheim | 426/565 |
| 3,291,076 | 12/1966 | Flanigan et al. | 426/565 |
| 3,360,384 | 12/1967 | Kurzinski et al. | 426/565 |
| 3,647,472 | 3/1972 | Speech et al. | 426/565 |
| 3,985,909 | 10/1976 | Kirkpatrick | 426/572 |
| 3,985,910 | 10/1976 | Kirkpatrick | 426/572 |
| 4,001,457 | 1/1977 | Hegadorn | 426/572 |
| 4,031,262 | 6/1977 | Nakayama et al. | 426/565 |
| 4,310,559 | 1/1982 | Mita et al. | 426/565 |
| 4,333,315 | 6/1982 | Zemelman et al. | 62/1 |
| 4,347,707 | 9/1982 | Zmelman et al. | 62/69 |
| 4,398,394 | 8/1983 | Kleiner et al. | 62/1 |
| 4,398,395 | 8/1983 | Hinman et al. | 62/1 |

OTHER PUBLICATIONS

Davidson, "Clathrate Hydrates", in *Water: A Comprehensive Treatise*, vol. 2, Frank, ed., Plenum Press, New York, 1973, Chap. 3.

Primary Examiner—Jeanette Hunter
Attorney, Agent, or Firm—Brumbaugh, Graves, Donohue & Raymond

[57] ABSTRACT

An effervescent ice confection product is obtained by exposing $CO_2$ - water clathrate-containing particles to such pressure, temperature and $CO_2$ and water partial pressure conditions that a protective layer will be formed on the particles, mixing said particles with a liquid phase containing ice confection ingredients and usually solid ice and having a temperature such that frozen water will not melt therein and thereafter decreasing the temperature of the obtained mixture to a usual storage temperature.

22 Claims, No Drawings

METHOD FOR PRODUCING AN ICE CONFECTION PRODUCT AND ICE CONFECTION PRODUCT

In previous attempts to incorporate $CO_2$ into ice confection products, the desired amount of $CO_2$ could not be incorporated in a reproducible and controlled way to obtain the effervescing effect as known with carbonated drinks.

The invention now provides a method of preparing an ice confection product comprising combining particulate frozen water and a flavoured liquid phase and thereafter further cooling the obtained mixture, which is characterised in that $CO_2$ - water clathrate-containing particles are exposed to such pressure, temperature and $CO_2$ and water partial pressure conditions that a protective layer will be formed on the particle surfaces, and are mixed with the liquid phase which may contain solid ice, the liquid phase having a temperature such that frozen water would not be melted or dissolved overall in said liquid phase and afterwards the temperature of the mixture is lowered to a usual storage temperature for ice confections. Usually the liquid phase comprises water-ice crystals before the clathrate-containing particles are added, which water-ice crystals are in equilibrium with the liquid phase and are forming therewith a slurry. This slurry may be obtained in a usual manner by feeding the unfrozen mix to a scraped-surface heat exchanger wherein it is cooled to a temperature of about $-0°$ to $-7°$ C. or even lower.

In this specification $CO_2$- water clathrate is meant to comprise any $CO_2$-containing clathrate such as double clathrates and mixed clathrates. For a better description thereof reference is made to D. W. Davidson; Clathrate Hydrates in water - A Comprehensive Treatise; Vol. 2, Chapter 3. Ed. Franks.

In practice it is to be preferred that the $CO_2$-water clathrate-containing particles are exposed to such $CO_2$ pressure and temperature conditions, that $CO_2$ will evolve from the particle surfaces until a protective ice layer is formed, which for practical purposes prevents further $CO_2$ evolution under atmospheric conditions at temperatures below the melting temperature of ice. Usually this protective ice layer is formed within 15 seconds and consequently the stabilisation treatment is to be carried out for more than 15 seconds.

A protective layer can also be formed around the $CO_2$-water clathrate-containing particles by exposing these particles to a water-containing environment under such conditions that a layer of solid water condenses on the surfaces of the particles. This environment preferably comprises water vapour, which is condensed on the surfaces of the particles to form a solid protective ice layer thereon.

Although the particle sizes of the clathrate-containing particles can be of the same order as the ice particles in the ice confection product to which the clathrate is to be added, in practice preferably particle sizes of from 200 to $2000/\mu$ are used. By incorporating relatively large clathrate-containing particles, preferably having sizes in the range 0.2 to 1 cm, a product is obtained giving a peculiar sensation on eating.

In this specification the term ice confection product is used in a broad sense, comprising products such as water-ice confection and ice-cream.

The invention will be exemplified in the following non-limiting examples.

EXAMPLE I

An ice mix containing
18 g sucrose
6 g corn syrup 63 DE (80% by weight)
0.1 g locust bean gum
0.3 g malic acid
0.25 g sodium citrate
0.45 g citric acid
3.0 g lemon concentrate
0.003 g tartrazine
0.15 g flavour (Zimmerman 139)
water to 100 g
is cooled in a scraped-wall heat exchanger to $-5°$ C. to form a fluid slush product.

In a pressurized reactor, $CO_2$ is contacted with water at a pressure of 35 bar and a temperature of 5° C. Thereafter the temperature is reduced to $-15°$ C., such that the carbonated composite solidifies. After removal from the reactor, the clathrate-ice composite formed by this procedure is ground in a cooled mill to a particle size of $500-2000/\mu$. These clathrate-ice composite particles are exposed to the atmosphere for 30 seconds and thereafter 25 g of this particulate clathrate-water ice composite is added to 75 g of the slush product as described above.

After mixing, the combined product is frozen to $-20°$ C. for storage.

EXAMPLE II

An ice mix containing
10% skim milk powder
2.6% whey powder
15% sucrose
7% dextrose monohydrate
2.5% maltodextrin DE 40
0.2% locust bean gum
0.02% kappa carrageenan
7% palm kernel oil
0.5% mgp (mono-diglyceride)
0.3% malic acid
0.3% sodium citrate
0.003% red colour (Ponceau 4R)
0.1% strawberry flavour (ex Bush Boake Allen)
water to 100%
is aerated and cooled in a scraped-surface heat exchanger to $-6°$ C. to form a creamy fluid.

A clathrate-containing product prepared as described in Example I is ground to coarse particles and a sieve fraction from 1 to 5 mm is separated, stabilized as described in Example I and admixed in an amount of 50 g to 250 g of creamy ice fluid. This combined mixture is frozen to $-20°$ C. for storage.

I claim:
1. A method for preparing a carbonated ice confection product comprising the steps of:
    (a) preparing a flavored ice confection fluid phase,
    (b) cooling the fluid phase such that a partially frozen slurry is obtained,
    (c) contacting $CO_2$ with water under pressure at a cooling temperature such that a solid $CO_2$ clathrate ice composite forms,
    (d) grinding the solid clathrate-ice composite to obtain $CO_2$ clathrate-ice composite particles,
    (e) exposing the $CO_2$ clathrate-ice composite particles to $CO_2$, moisture, temperature and pressure conditions for a period of time sufficient to allow a protective coating to form on the surface of the clathrate particles which prevents loss of $CO_2$ from the clathrate particles, (f) mixing the partially frozen slurry and the coated clathrate particles; and (g) further freezing the mixture to form a carbonated ice confection product.

2. Method according to claim 1 in which the partially frozen slurry contains water ice crystals in equilibrium with non-frozen fluid.

3. Method according to claim 1 in which prior to addition of the clathrate particles the partially frozen slurry is maintained at a temperature which is sufficient to maintain a partially frozen state.

4. Method according to claim 3 in which the partially frozen slurry is cooled to a temperature between 0° and −7° C.

5. Method according to claim 1 in which the solid $CO_2$ clathrate-ice composition is formed in a pressurized reactor at a pressure of 35 bar.

6. Method according to claim 5 in which the $CO_2$ clathrate-ice composition is formed by first contacting the $CO_2$ with water at a temperature of 5° C. and thereafter reducing the temperature to −15° C. such that a solid $CO_2$ ice clathrate forms.

7. Method according to claim 9 in which the $CO_2$ clathrate-ice composition particles are between 200μ and 1 cm in size.

8. Method according to claim 7 in which the $CO_2$ clathrate-ice composition particles are between 200 and 2000μ in size.

9. Method according to claim 8 in which the $CO_2$ clathrate-ice composition particles are between 500 and 2000μ in size.

10. Method according to claim 7 in which the $CO_2$ clathrate-ice composition particles are between 1 and 5 mm in size.

11. Method according to claim 7 in which the $CO_2$ clathrate-ice composition particles are between 0.2 and 1 cm in size.

12. Method according to claim 1 in which the coated $CO_2$ clathrate-ice composition particles are obtained by exposing the $CO_2$ clathrate-ice composition particles to atmospheric conditions for at least 15 seconds to allow a protective coating of ice to form on the surface of the particles.

13. Method according to claim 12 in which the coated $CO_2$ clathrate-ice composite particles are obtained by exposing the $CO_2$ clathrate-ice particles to air for 30 seconds.

14. Method according to claim 1 in which the coated $CO_2$ clathrate-ice composite particles are obtained by exposing the $CO_2$ clathrate-ice composition particles to water vapor for a period of time sufficient to allow a protective coating of ice to form on the surface of the particles.

15. Method according to claim 1 in which the mixture of partially frozen slurry and coated $CO_2$ clathrate-ice composition particles is further frozen at −20° C.

16. A carbonated ice confection product comprising a mixture of a flavored fluid phase which has been cooled to form a partially frozen slurry and ice coated $CO_2$ clathrate-ice composition particles, wherein the ice coated $CO_2$ clathrate-ice composition particles have been formed by contacting $CO_2$ with water under pressure at a cooling temperature such that a solid $CO_2$ clathrate ice composite forms, grinding the solid composite to obtain $CO_2$ clathrate-ice composite particles and exposing the $CO_2$ clathrate-ice composite particles to atmospheric conditions for a period of time to allow a protective ice coating to form on the surface of the clathrate particles which prevents loss of $CO_2$ from such coated clathrate particles, and wherein the mixture is further frozen to form a carbonated ice confection product.

17. Ice confection product as in claim 16 in which the fluid phase comprises ingredients selected from the group consisting of liquid, sugar, flavoring, stabilizers, emulsifiers, protein, fat, air and mixtures thereof.

18. Ice confection product as in claim 16 in which the $CO_2$ clathrate-ice composition particles are between 200μ and 1 cm in size.

19. Ice confection product as in claim 18 in which the $CO_2$ clathrate-ice composition particles are between 200 and 2000μ in size.

20. Ice confection product as in claim 19 in which the $CO_2$ clathrate-ice composition particles are between 500 and 2000μ in size.

21. Ice confection product as in claim 18 in which the $CO_2$ clathrate-ice composition particles are between 1 and 5 mm in size.

22. Ice confection product as in claim 18 in which the $CO_2$ clathrate-ice composition particles are between 0.2 and 1 cm in size.

* * * * *

UNITED STATES PATENT AND TRADEMARK OFFICE
CERTIFICATE OF CORRECTION

PATENT NO. : 4,738,862
DATED : 04/19/88
INVENTOR(S) : Bee

It is certified that error appears in the above-identified patent and that said Letters Patent is hereby corrected as shown below:

Col. 1, line 60, "2000 $\mu$are" should read --2000/u are--

Col. 3, line 25, "claim 9" should read --claim 1--.

Signed and Sealed this

Twentieth Day of September, 1988

Attest:

DONALD J. QUIGG

Attesting Officer

Commissioner of Patents and Trademarks